United States Patent [19]

Yamanami et al.

[11] Patent Number: 4,878,553
[45] Date of Patent: Nov. 7, 1989

[54] POSITION DETECTING APPARATUS

[75] Inventors: Tsuguya Yamanami, Okegawa; Takahiko Funahashi, Kuki; Toshiaki Senda, Okegawa, all of Japan

[73] Assignee: Wacom Co., Ltd., Saitama, Japan

[21] Appl. No.: 95,702

[22] Filed: Sep. 14, 1987

[30] Foreign Application Priority Data

Sep. 12, 1986 [JP] Japan ............................ 61-213970

[51] Int. Cl.$^4$ ............................................. G08C 21/00
[52] U.S. Cl. ......................................... 178/18; 341/15
[58] Field of Search ............... 178/18, 19; 340/347 P, 340/870.31; 341/5, 15

[56] References Cited

U.S. PATENT DOCUMENTS

| | | | |
|---|---|---|---|
| 3,299,424 | 1/1967 | Vinding | 340/870.31 |
| 4,616,106 | 10/1986 | Fowler et al. | 178/18 |
| 4,697,050 | 9/1987 | Farel et al. | 178/18 |
| 4,713,496 | 12/1987 | Kimura et al. | 178/18 |

Primary Examiner—William M. Shoop, Jr.
Assistant Examiner—Marc S. Hoff
Attorney, Agent, or Firm—Pollock, VandeSande & Priddy

[57] ABSTRACT

A position detecting apparatus for detecting a position pointed by a pointer on a system such as a digitizer has the following parts: a position detection section having a plurality of loop coils arrayed in a side-by-side fashion in the direction of position detection; a selection circuit for successively selecting the loop coils one-by-one; a transmission circuit for generating an A.C. signal of a predetermined frequency to be delivered to the selected loop coil; a receiving circuit adapted to detect an induced voltage of a frequency substantially the same as that of the A.C. signal from among various voltages induced in the selected loop coil; a connection switching circuit for connecting the selected loop coil alternately to the transmission circuit and the receiving circuit; a position pointer having a tuning circuit including a coil and a capacitor and adapted to resonate with an electric wave produced by the loop coil which is supplied with the A.C. signal; and a processing device for determining the position pointed by the position pointer by processing signals representing the levels of voltages induced in the loop coils.

7 Claims, 8 Drawing Sheets

POSITION DETECTING APPARATUS

BACKGROUND OF THE INVENTION

1. Field of the Invention

The present invention relates to a position detecting apparatus for detecting the position pointed by a pointing device and, more particularly, to a position detecting apparatus which can detect, with a high degree of detecting precision, the position pointed by a pointer which is not connected to the body of the apparatus both electrically and mechanically.

2. Description of the Prior Art

A position detecting apparatus has been known in which an electric pulse current is supplied to a driving coil provided on one end of a magnetostrictive transmission medium or on the pointing end of a position pointer so as to generate a magnetostrictive vibration wave in the magnetostrictive transmission medium, and the position pointed by the pointer is detected by suitably processing the time between the moment at which the magnetostrictive vibration wave is generated and the moment at which a voltage induced by the magnetostrictive vibration wave in a detection coil is provided on the pointing end of the position pointer or on one end of the magnetostrictive transmission medium.

Also known is a position detecting apparatus in which a plurality of driving lines and detecting lines is arranged orthogonally to each other and a position is pointed by a pointer having a magnetic member such as ferrite, the driving lines are successively supplied with electric current and the detecting lines are accessed sequentially so that the position pointed by the pointer is identified by the position of the detecting line in which the highest voltage is induced.

The position detecting apparatus of the type mentioned first exhibits an appreciably high degree of detecting precision but the handling is undesirably restricted due to the presence of a cord which is essentially required for the purpose of exchange of timing signals between the pointer and the processing device. In addition, the position pointer has to be held substantially perpendicularly to and in the close proximity of the magnetostrictive transmission medium.

On the other hand, the position detecting apparatus of the second-mentioned type suffers from a problem in that the resolution of the coordinates position is determined by the pitch of the detecting lines. A higher resolution would be obtained by reducing the pitch of the detecting lines but such a reduced pitch will undesirably impair the S/N ratio of the detection signal, as well as the stability of detection performance, so that any increase in the resolution is materially impossible to obtain. In addition, it is rather difficult to detect the position right above each of the points of intersection between the driving lines and the detecting lines. Furthermore, the pointer has to be placed in the very close proximity of the lines.

SUMMARY OF THE INVENTION

Accordingly, a first object of the present invention is to provide a position detection apparatus incorporating a cordless pointer which is not connected to any part of the stationary portion of the apparatus, and thus facilitating the handling while attaining a high degree of precision in the position detection.

To this end, according to a first aspect of the present invention, there is provided a position detecting apparatus comprising: a position detection section having a plurality of loop coils arrayed in a side-by-side fashion in the direction of position detection; a selection circuit for successively selecting the loop coils one-by-one; a transmission circuit for generating an A.C. signal of a predetermined frequency to be delivered to the selected loop coil; a receiving circuit adapted to detect an induced voltage of a frequency substantially the same as that of the A.C. signal from among various voltages induced in the selected loop coil; a connection switching circuit for connecting the selected loop coil alternately to the transmission circuit and the receiving circuit; a position pointer having a tuning circuit including a coil and a capacitor and adapted to resonate with an electric wave produced by the loop coil which is supplied with the A.C. signal; and a processing device for determining the position pointed by the position pointer by processing signals representing the levels of voltages induced in the loop coils.

In operation, a loop coil is selected from among a plurality of loop coils by the selection circuit and the transmission circuit is connected to this selected loop coil by means of the connection switching circuit so that A.C. current signal is supplied to the loop coil, whereby an electric wave is generated by the loop coil. The electric wave thus generated excites the coil in the position pointer which points a position on the position detection area, so that a voltage is induced in the coil in synchronization with the A.C. current signal mentioned before. Thereafter, the receiving circuit is connected to the loop coil selected by the connection switching circuit and, at the same time, the supply of the A.C. current signal is ceased so that the electric wave is extinguished. Meanwhile, the current corresponding to the induced voltage flows in the tuning circuit in the position pointer, so that the coil in the tuning circuit generates an electric wave. This electric wave excites the loop coil which has been selected and connected to the receiving circuit, so that a voltage is induced in this loop coil. The described exchange electric waves is conducted successively on all the loop coils. Since this exchange of electric waves relies upon resonance between each loop coil and the coil in the position pointer, the level of the voltage induced in the loop coil has such a dependency on the distance between the present position of the pointer, i.e., the pointed position, and the loop coil that the level of the induced voltage is highest in the loop coil which is closest to the present position of the pointer and is gradually decreased as the distance between the position of the pointer and the loop coil is increased. The levels of voltage induced in these loop coils are suitably processed by the processing device and the coordinates of the pointed position can be identified by the position of the loop coil which exhibits the highest level of the induced voltage amongst the loop coils.

In this arrangement, when the position pointer is moved in the direction perpendicular to the direction of the position detection, no change is caused in the distance between the pointer and each loop coil, so that the same coordinate value is obtained regardless of the change in the position of the pointer in the direction perpendicular to the position detection.

Thus, in the position detection apparatus in accordance with the first aspect of the present invention, a plurality of loop coils is arrayed in the direction of position detection and the transmission of an electric wave from one of the loop coils to the position pointer and transmission of another electric wave from the position pointer to the same loop coil are conducted successively on all the loop coils while the levels of the voltage induced in these coils are examined. The levels of the voltages induced in these loop coils are suitably processed so that the position pointed by the position pointer can be determined in terms of the position of the loop coil which exhibits the highest level of the induced voltage amongst all the loop coils.

In this apparatus, therefore, the position pointer can simply be constructed only with a tuning circuit which is constituted mainly by a coil and a capacitor. Thus, the necessity for the provision of cord between the position pointer and the stationary part of the apparatus for the purpose of signal exchange therebetween is completely eliminated. In addition, the position pointer is not required to carry any heavy part such as battery or magnet. For these reasons, the handling characteristic of the position pointer can be improved remarkably. The position detecting section also can have a simple construction without any special part, so that the size of the position detecting area can be increased to make the apparatus applicable to devices having a large position detection area, e.g., electronic writing panel or board. In addition, the precision of position detection can be increased by enhancing the precision of arithmetic operation on the levels of voltage induced in the plurality of loop coils.

Another object of the present invention is to provide a position detecting apparatus incorporating a position pointer which is not connected to any part of the stationary portion of the apparatus and yet is capable of detecting two-dimensional coordinates value of tee pointed position with a high degree of precision.

To this end, according to a second aspect of the present invention, there is provided a position detecting apparatus comprising: a position detection section having a plurality of X-loop coils arrayed in a side-by-side fashion in X-direction and a plurality of Y-loop coils arrayed in a side-by-side fashion in Y-direction X- and Y-selection circuits for successively selecting the loop coils one-by-one from the X-loop coils and from the Y-loop coils, respectively; a transmission circuit for generating an A.C. signal of a predetermined frequency to be delivered to the selected X- and Y-loop coils; a receiving circuit adapted to detect an induced voltage of a frequency substantially the same as that of the A.C. signal from among various voltages induced in the selected X- and Y-loop coils; X- and Y-connection switching circuits for connecting the selected X- and Y-loop coils alternately to the transmission circuit and the receiving circuit; a position pointer having a tuning circuit including a coil and a capacitor and adapted to resonate with an electric wave produced by the X- and Y-loop coils supplied with the A.C. signal; and a processing device for determining the position pointed by the position pointer both in X- and Y-directions by processing signals representing the levels of voltages induced in the X- and Y-loop coils.

According to this arrangement, the position pointed by the position pointer can be determined two-dimensionally in terms of X- and Y-coordinates values, by virtue of the resonance between the coil in the position pointer and the loop coils which are arrayed both in X- and Y-directions. Thus, the apparatus in accordance with the second aspect offers, besides the advantages brought about by the apparatus of the first aspect, an advantage that the position can be detected in a two-dimensional plane in terms of X- and Y-coordinate values.

These and other objects, features and advantages of the present invention will become clear from the following description of the preferred embodiments when the same is read in conjunction with the accompanying drawings.

DESCRIPTION OF THE PREFERRED EMBODIMENTS

Figure 1:
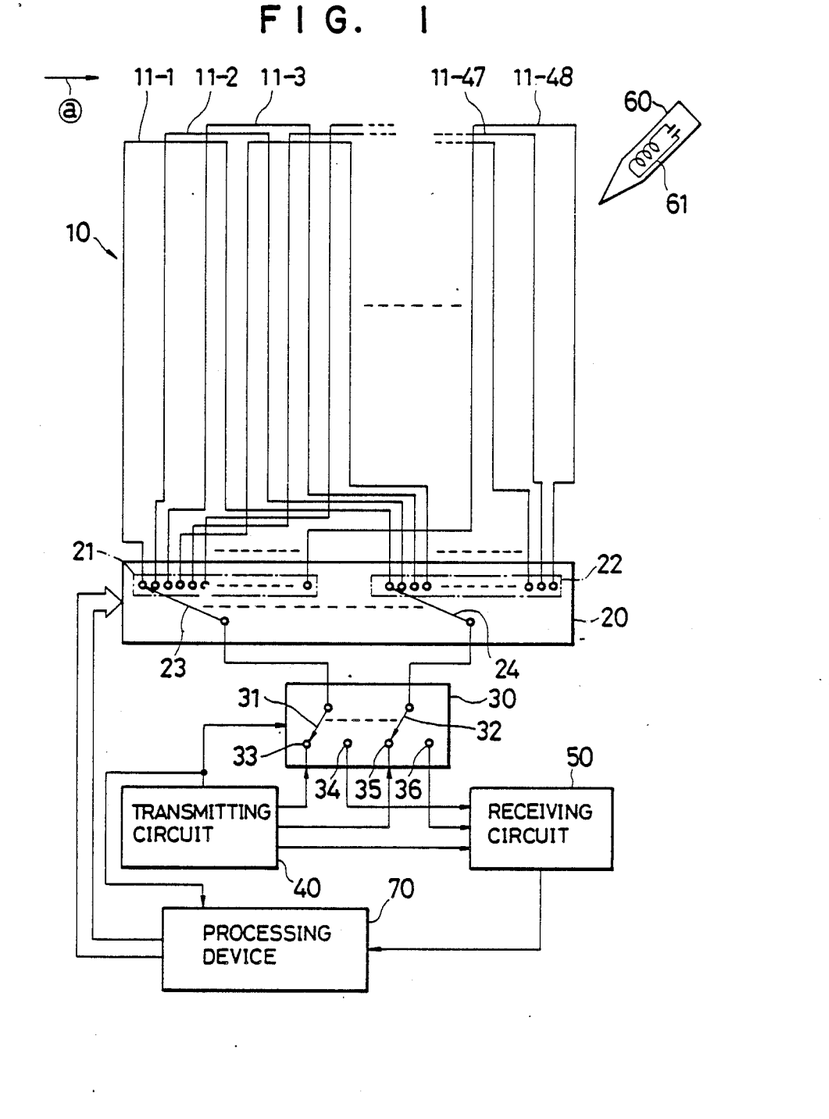
FIG. 1 is a connection and block diagram showing the basic construction of a first embodiment of the position detecting apparatus in accordance with the present invention.

Referring first to FIG. 1, a first embodiment of the position detecting apparatus in accordance with the present invention is constituted mainly by a position detecting section 10, a selection circuit 20, a receiving circuit 50, a transmission circuit 40 a connection switching circuit 30, a position pointer 60 and a processing device 70.

The position detecting section 10 includes a plurality of parallel conductors which are arrayed in a side-by-side fashion in the direction of position detection. In the illustrated embodiment, 48 loop coils 11-1 to 11-48 are arrayed in the direction of position detection shown by an arrow a. More specifically, these loop coils 11-1 to 11-48 are arranged in parallel in such a manner as to partially overlap the adjacent loop coils. Although in the illustrated embodiment each loop coil has a single turn, this is not exclusive and each loop coil may have two or more turns.

These loop coils may be formed by forming a plurality of parallel conductors by, for example, etching on a known print substrate and then suitably connecting these conductors by jumper lines such as to form the plurality of loop coils, thereby forming the position detecting section 10.

The selection circuit 20 has a function for successively selecting one from among the plurality of loop coils 11-1 to 11-48. The loop coils 11-1 to 11-48 have one end connected to a first group of terminals 21 and the other end connected to the other group of terminals 22. The selection circuit 20 has a selection contact 23 for selecting one of the terminals 21 of the first group and a selection contact 24 for selecting one from the second group of terminals 22. The selection contacts 23 and 24 are operatively connected to each other so that they select both ends of the same loop coil, thereby enabling the successive loop coils to be selected one after another. This selection circuit can simply be constructed by combining a multiplicity of multiplexers which are known per se.

The connection switching circuit 30 is adapted to connect, the loop coil selected by the selection circuit 20 alternate to the transmission circuit 40 and receiving circuit 50. The connection switching circuit 30 has selection contacts 31 and 32 to which are connected to the selection contacts 23 and 24 of the selection circuit 20 mentioned before. The connection switching circuit 30 also has terminals 33 and 35 connected to two output terminals of the transmission circuit 40 and terminals 34 and 36 connected to two input terminals of the receiving circuit 50. The selection contact 31 adapted to select one of the terminals 33 and 34 and the selection contact 32 adapted to select one of the terminals 35 and 36 are operatively connected to each other so that they are switched simultaneously to connect the selected loop coil either to the transmission circuit 40 or to the receiving circuit 50 in accordance with a later-mentioned transmission/receiving signal.

The connection switching circuit 30 also can be constructed by known multiplexers.

Figure 2:
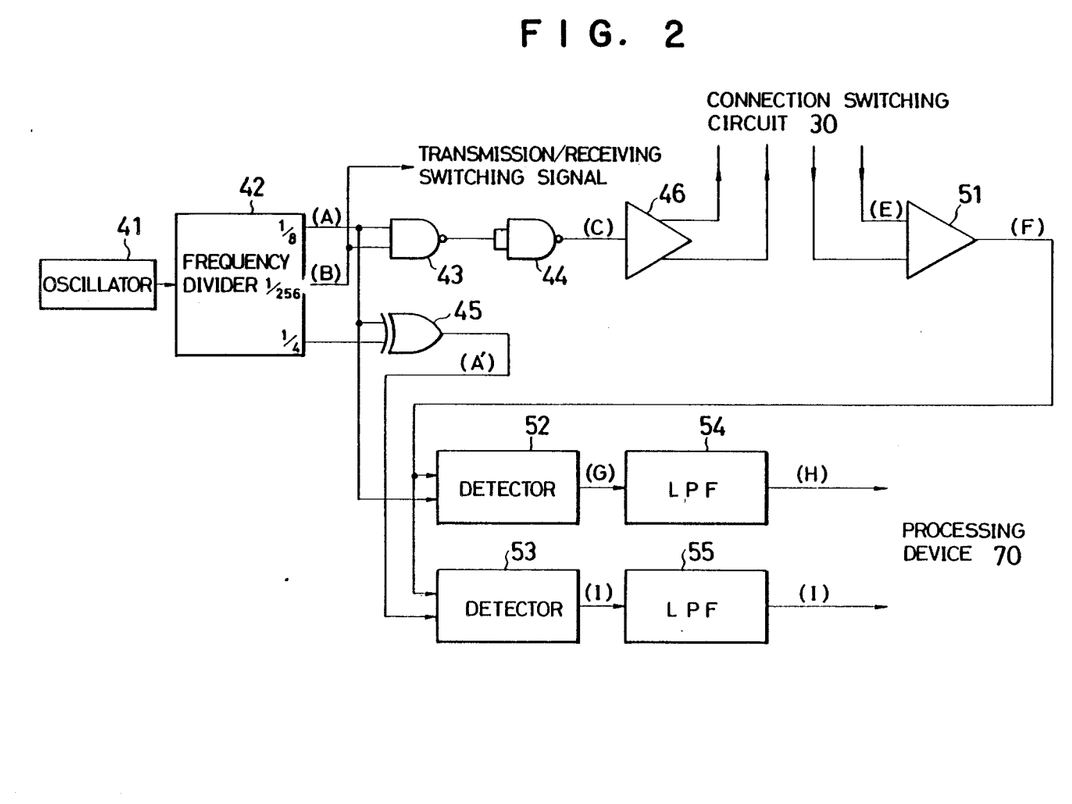
FIG. 2 is a block diagram showing the detail of a transmission circuit and a receiving circuit which are incorporated in the embodiment shown in FIG. 1.

FIG. 2 shows the detail of the transmission circuit 40 and the receiving circuit 50. The transmission circuit 40 is constituted mainly by an oscillator 41, a frequency divider 42, NAND gates 43, 44, an EXCLUSIVE OR (EXOR) gate 45 and a driving circuit 46. On the other hand, the receiving circuit 50 is mainly constituted by an amplifier 51, phase detectors 52, 53, and low-pass filters (LPF) 54, 55.

Figure 3:
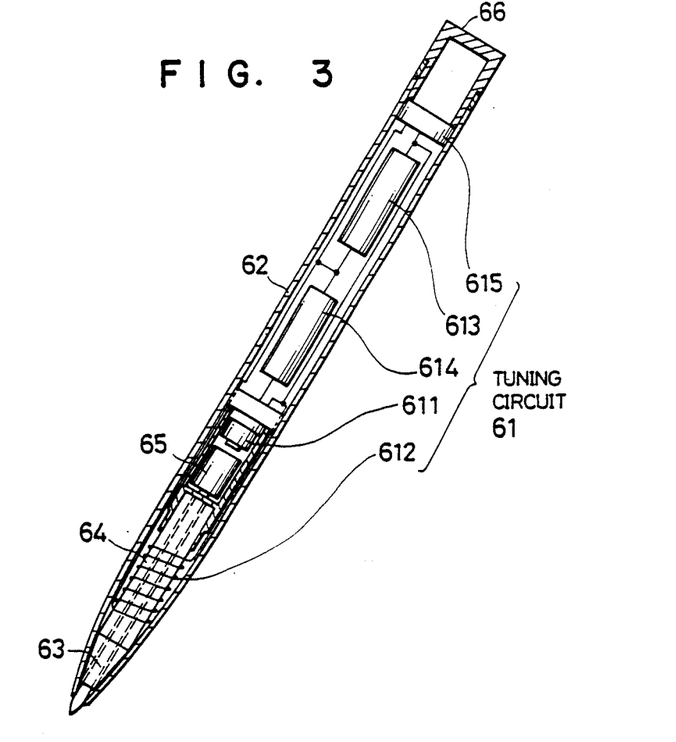
FIG. 3 is an illustration of the internal structure of an input pen.

A position pointer 60, which will be referred to as "input pen" hereinafter, has a tuning circuit 61 which includes a coil and a capacitor. As will be seen from FIG. 3, the input pen 60 has a pen holder 62 made of a nonmetallic material such as a synthetic resin. The pen holder 62 receives, as mentioned from the pointing end, a pointing member 63 similar to the core of a ball point pen, a ferrite core 64 having an aperture which slidably receives the pointing member 63, a coiled spring 65, and a tuning circuit 61 constituted by a coil 612 wound around the ferrite core 64, capacitors 613, 614 and a variable capacitor 615. The end of the pen holder 62 opposite to the pointing end is capped as by 66.

Figure 4:
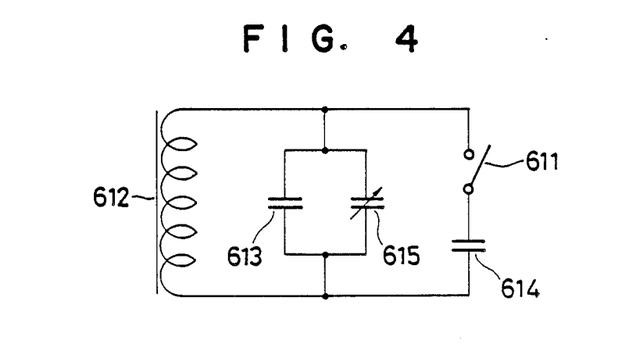
FIG. 4 is an illustration of the construction of a tuning circuit.

As will be understood also from FIG. 4, the capacitor 613 and the variable capacitor 615 are connected in parallel to each other and both ends of this parallel connection are connected to the coil 612, thus constituting a parallel resonance circuit which is known per se. The reactance and capacitances of the coil 612, capacitor 613 and the variable capacitor 615 are so determined that the tuning circuit can resonate with the frequency of the electric wave produced by the loop coil of the position detecting section 10.

On the other hand, the capacitor 614 is connected to both ends of the coil 612 through the switch 611. The capacitor 614 has a function to delay the phase of the electric current in the above-mentioned parallel resonance circuit by a predetermined angle, when the switch 611 is turned on. When the pointing end of the pointing member 63 is pressed onto the input surface (not shown) of the position detecting section 10, the switch 611 is pressed by the rear end of the pointing member 63 through the coiled spring 65, whereby the switch 611 is turned on.

The processing device 70 controls the switching between the successive loop coils in accordance with a latermentioned transmission/receiving switching signal and the output of the receiving circuit 50.

The operation of this embodiment will be described hereinunder. The description will be commenced first in regard to the exchanges of electric waves between the position detecting section 10 and the input pen 60, as well as signals obtained as a result of the exchange of the electric waves, with specific reference to FIG. 5.

Figure 5:
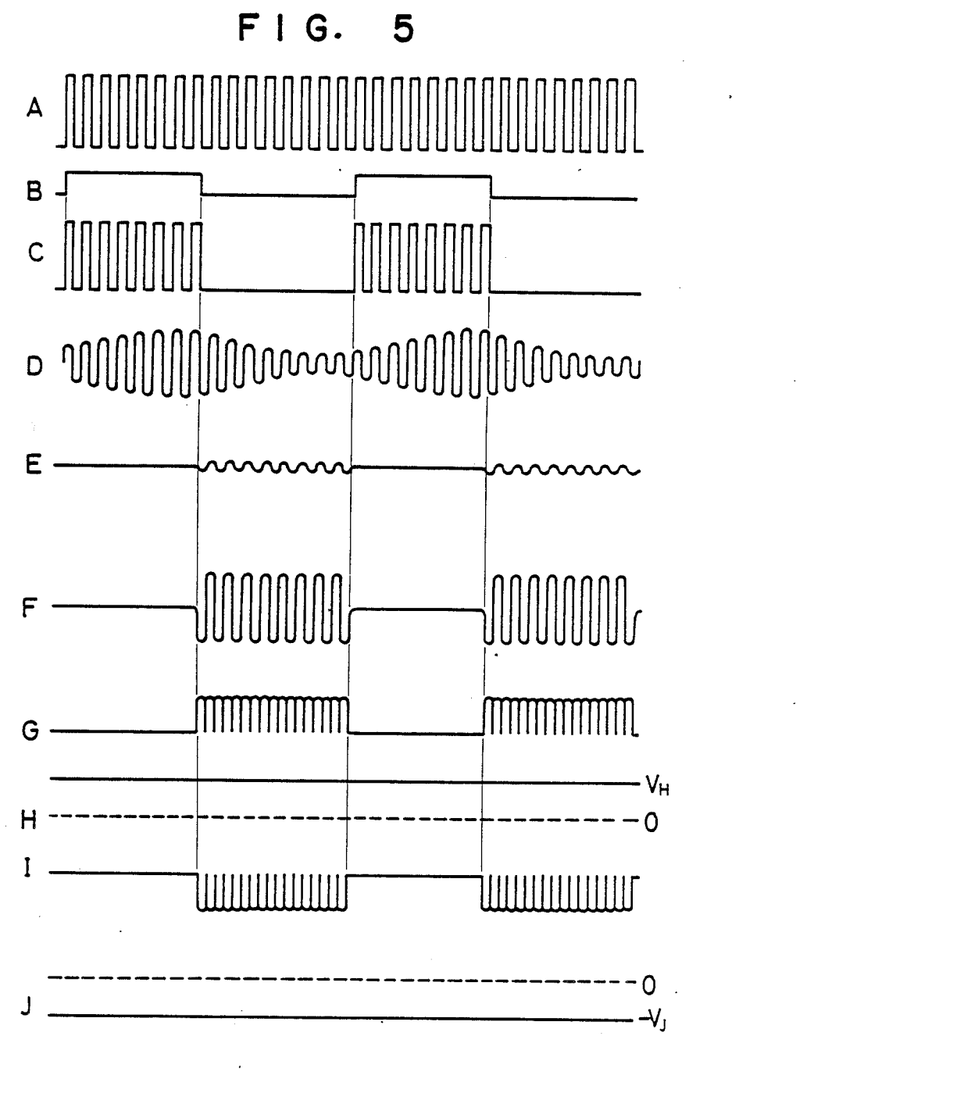
FIG. 5 is a waveform chart showing waveforms of signals obtained in various portions of the embodiment.

Clock pulses of a predetermined frequency, e.g., 4 MHz produced by the oscillator 41 are demultiplied by the frequency divider 42 into signals of ¼, ⅛ and 1/256 frequencies. A pulse signal A of 500 KHz, obtained by demultiplication into ⅛ frequency, is input to one of the input terminals of the NAND gate 43, while the other input terminal of the NAND gate 43 receives a transmission/receiving switching signal B of 15.625 KHz obtained by demultiplication into 1/256 frequency. The output of the NAND gate 43 is inverted through the NAND gate 44 so that a signal C, which outputs a pulse signal of 500 KHz at an interval of 32 μsec, is obtained.

The signal C is converted into a balance signal by means of the driving circuit 46 and is delivered to one 11-$i$ of a plurality of loop coils constituting the position detection section 10 through the connection switching circuit 30 and the selection circuit 20, so that the loop coil 11-$i$ generates an electric wave corresponding to the signal C mentioned before.

If the input pen 60 has been held in the vicinity of the loop coil 11-$i$ of the position detecting section substantially perpendicularly to the position detecting section 10, the electric wave generated by the loop coil 11-$i$ excites the coil 612 of the input pen 60, so that a voltage D is induced in the tuning circuit 61 in synchronism with the signal C.

The receiving period begins when the duration of the signal C expires. As the receiving period starts, the loop coil 11-$i$ is connected to the receiving circuit 50 so that the electric wave from the loop coil 11-$i$ extinguishes without delay. However, since no change is caused in the circuit elements of the tuning circuit 61 of the input pen 60, the induced voltage is progressively attenuated.

The voltage D induced in the tuning circuit 61 generates an electric current which flows through the coil 612. In consequence, the coil 612 generates an electric wave which acts to excite the loop coil 11-$i$ which is connected to the receiving circuit 50, so that a voltage E is induced in the loop coil 11-$i$.

The connection switching circuit 30 is switched by the transmission/receiving switching signal B so that it picks up the signal from the loop coil 11-$i$ only during suspension of transmission of the signal from the loop coil 11$i$. Thus, the connection switching circuit 30 delivers the signal voltage E induced in the loop coil 11-$i$ to the amplifier 51. The amplified signal F derived from the amplifier 51 is delivered to the phase detectors 52 and 53.

The phase detector 52 also receives the pulse signal A mentioned before as a phase detecting signal. If the phase of the received signal F coincides with the phase of the pulse signal A, the phase detector 52 produces a signal G which is formed by inverting the received signal F to the positive or plus side. The signal G is converted, by the low-pass filter 54 having a sufficiently low cut-off frequency, into a flat signal H having a voltage level of VH and the thus obtained signal H is delivered to the processing device 70.

The phase detector 53 also receives, as the detecting signal, a pulse signal A' (not shown) which is formed by the EXOR gate 45 as EXCLUSIVE OR of the pulse signal A and a pulse signal which has a frequency twice as high as the frequency of the pulse signal A. Thus, the detecting signal A' has the same frequency as the pulse signal A and a phase which is 90° behind the phase of the pulse signal A. If the phase of the received signal F coincides with the phase of the pulse signal A', the phase detector 53 produces a signal I which is obtained by inverting the received signal F to the negative or minus side. The signal I is input to the low-pass filter 55 having a sufficiently low cut-off frequency so that it is converted into a flat signal J of a voltage level $-VJ$. The thus obtained signal I is delivered to the processing device 70.

If the switch 611 has been turned off in the input pen 60, the phases of the voltage and the current in the tuning circuit at the resonance frequency coincide with each other as explained before. In consequence, the phase of the received signal F and the phase of the pulse signal A coincide with each other. In this state, the voltage appears only in the signal H but no voltage appears in the signal J.

Conversely, if the switch 611 in the input pen 60 has been turned on, the phase of the electric current in the tuning circuit 61 is delayed by a predetermined angle from the phase of the voltage at the resonance frequency, as explained before. Consequently, the phase of the received signal F is delayed by a predetermined angle from the phase of the pulse signal A. In this case, therefore, voltages appear both in the signals H and J. It will be understood, however, that the voltage appears only in the signal J if the delay of the phase is 90°.

The signals H and J delivered to the processing device 70 are converted into corresponding digital signals and are subjected to arithmetic operation in accordance with the following formulae (1) and (2).

$$V_x = (V_H^2 + V_J^2)^{\frac{1}{2}} \quad (1)$$

$$V_\theta = \tan^{-1}(VJ/VH) \quad (2)$$

The symbol $V_x$ represents a voltage value which is proportional to the, distance between the input pen 60 and the loop coil 11-$i$, while $V_\theta$ represents a voltage value which is proportional to the phase difference between the voltage and the current in the tuning circuit 61 of the input pen 60.

When the loop coil 11-$i$ which exchanges the electric waves with the input pen 60 is switched from one to another, the level of the voltage $V_x$ is changed so that the position of the input pen 60 can be detected by examining the voltage value $V_x$ as will be explained later.

On the other hand, the voltage value $V_\theta$ varies only in response to the turning of the switch 611 into on and off states. It is thus possible to distinguish the states of the switch 611 by comparing the voltage value $V_\theta$ with a predetermined threshold voltage.

Figure 6:
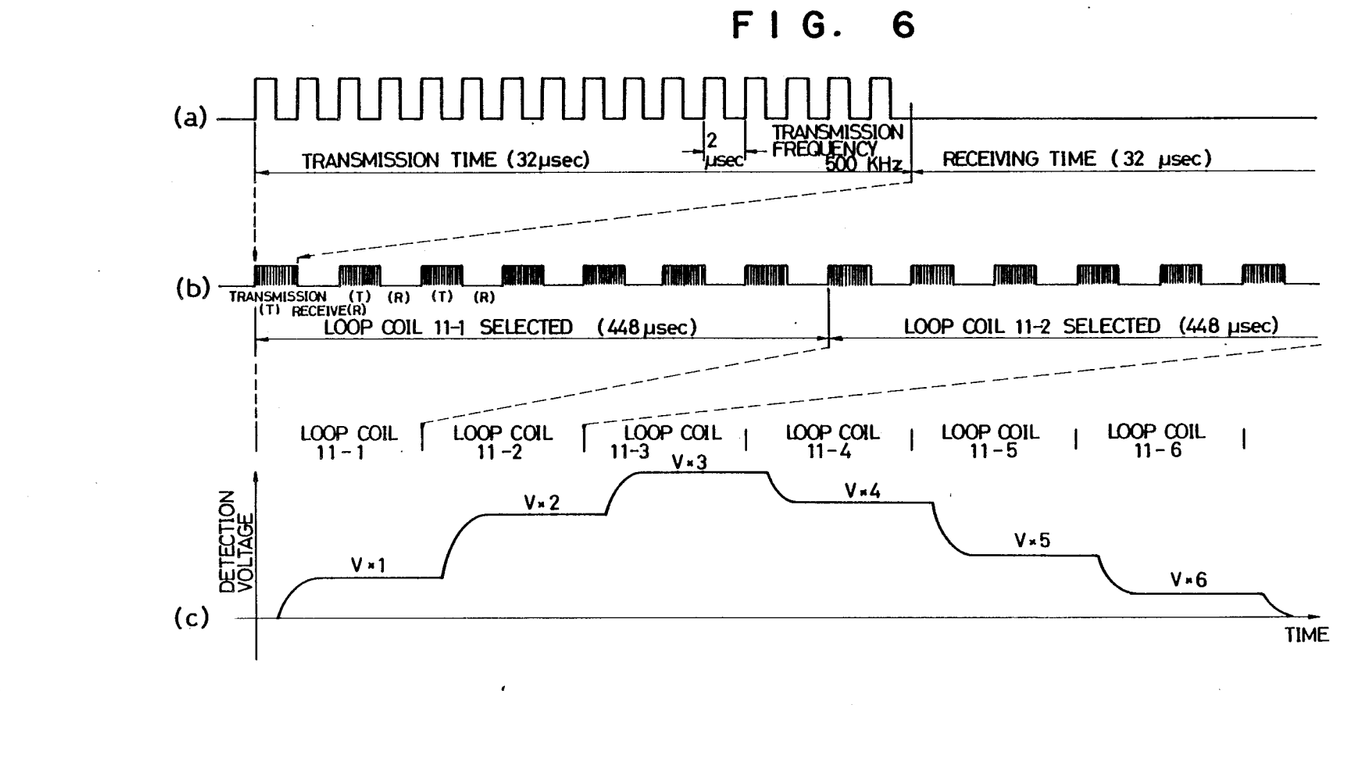
FIGS. 6(a), 6(b) and 6(c) are timing charts for explaining the basic position detecting operation in the embodiment shown in FIG. 1.

A description will be made hereinunder as to the position detecting operation performed by the apparatus of the present invention, with reference to FIGS. 6 to 8.

The position detecting operation is commenced as the power supply is turned on to supply electric power to the whole apparatus. The processing device 70 then delivers to the selection circuit 20 an instruction for enabling the selection circuit 20 to select the first loop coil 11-1 from among the loop coils 11-1 to 11-48 constituting the position detecting section 10, thereby connecting the loop coil 11-1 to the connection switching circuit 30. Then, the connection switching circuit 30 connects the loop coil 11-1 alternate to the transmission circuit 40 and the receiving circuit 50 in accordance with the transmission/receiving switching signal B.

In the transmission period of 32 μsec, the transmission circuit 40 delivers 16 pieces of pulse of 500 KHz to the loop coil 11-1, as shown in FIG. 6(a). The switching between the transmission and receiving is repeated seven times for each loop coil, e.g, for the loop coil 11-1, as shown in FIG. 6(b). The total period of seven cycles of switching between transmission and receiving corresponds to the period (448 μsec) over which each coil is selected.

In consequence, the phase detectors 52 and 53 of the receiving circuit 50 produce induced voltages for each of seven signal receiving periods of each loop coil. The induced voltages thus obtained are averaged by the low-pass filters 54 and 55 as explained before, and are then delivered to the processing device 70. These two types of induced voltages are processed by the processing device 70 in accordance with the formulae mentioned before so as to be converted into the detection voltage $V_{x1}$ 1 corresponding to the distance between the input pen 60 and the loop coil 11-1.

Subsequently, the processing device 70 delivers an instruction to the selection circuit 20 for enabling the latter to select the second loop coil 11-2 so that the second loop coil 11-2 is connected to the connection switching circuit 30. Then, a process similar to that explained in connection with the first loop coil 11-1 is executed so that a detection voltage $V_{x2}$ corresponding to the distance between the input pen 60 and the loop coil 11-2 is determined and stored. The described operation is conducted for all the remaining loop coils 11-3 to 11-48 by successively connecting these loop coils 11-3 to 11-48 to the connection switching circuit 30, whereby the respective detection voltages $V_{x1}$ to $V_{x48}$ corresponding to the distances between the input pen 60 and the respective loop coils are obtained as shown in FIG. 6(c). It is to be noted, however, that only FIG. 6(c) shows only some of such detection voltages.

Figure 7:
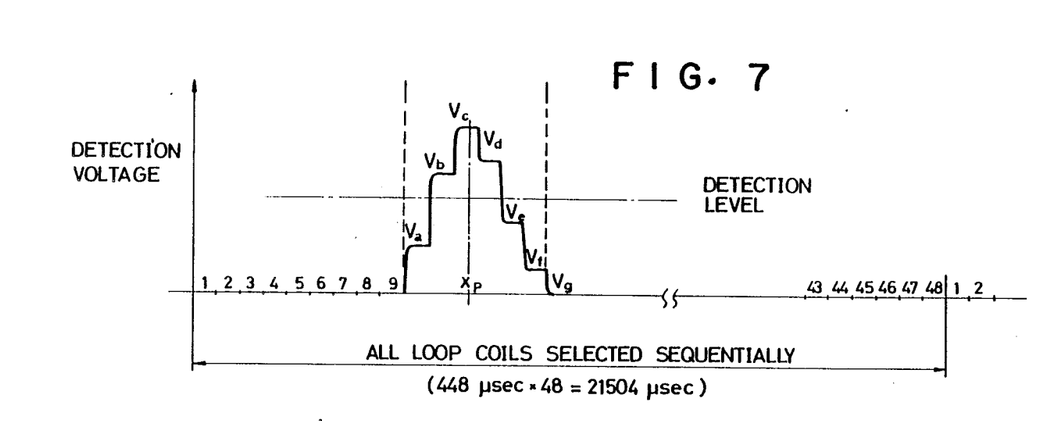
FIG. 7 is a graph showing the levels of voltages induced in loop coils in the first cycle of detecting operation.

Actually, the detection voltage appears only in several loop coils around the loop coil which is closest to the position (xp) where the input pen 60 is placed as shown in FIG. 7.

When the levels of the voltages stored as explained above exceed a predetermined detection level, the processing device 70 computes the coordinates values representing the position of the input pen 60 by processing these stored voltage values, and transfers the thus-computer coordinate values to a memory section which is not shown.

When the levels of the voltages stored as explained above exceed a predetermined detection level, the processing device 70 computes the coordinates values representing the position of the input pen 60 by processing these stored position values, and transfers the thus-computed coordinate values to a memory section which is not shown.

When the first position detecting operation is completed in the manner described hereinbefore, the processing device 70 delivers an instruction for enabling the selection circuit 20 to select only a predetermined number of loop coils, e.g., 10 loop coils, around the loop coil which has produced the maximum detection voltage. The position detecting operation is then conducted on these selected loop coils and the coordinate value representing the position of the input pen 60 is determined and delivered to the memory section so as to renew the content of the memory section.

Meanwhile, the processing device 70 computes, not only the detection voltages $V_{x1}$ to $V_{x48}$ for the respective but also the detection voltage $V_\theta$ corresponding to the phase difference between the voltage and the current in the tuning circuit 61 of the input pen 60, and compares the thus obtained detection voltage $V_\theta$ with a predetermined threshold voltage, for each of the successive loop coils. Therefore, when the switch 611 is turned on in the input pen 60, the on state of the switch 611 is detected by the processing device 70 from the result of the comparison between the detection voltage $V_\theta$ and the threshold value, and transmits the above-mentioned coordinate value obtained at this moment to an external device such as a computer (not shown).

Figure 8:
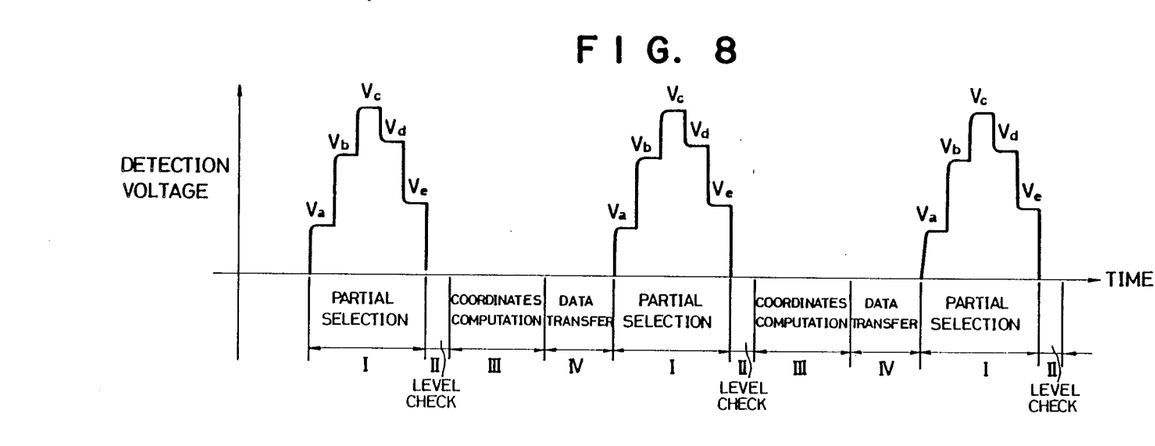
FIG. 8 is a graph showing the timing of the second and subsequent cycles of detecting operation.

FIG. 8 shows the timings in the second and other subsequent cycles of detecting operation performed by the processing device 70. Referring to this figure, the period "level check" is a period in which a check is conducted as to whether the maximum value of the detection voltage reaches the aforementioned detection level, and also as to whether which one of the loop coils exhibits the maximum detection voltage. If the level of the maximum detection voltage is below the detection level, the processing device 70 stops the computation of the coordinate values and determines the central one of a plurality of loop coils which are to be selected in the next cycle of the detecting operation.

A preferred method of determining the coordinate value xp is to approximate, by a suitable function, the waveform of a curve representing the detection voltages $V_{x1}$ to $V_{x48}$ in a region around a peak of the curve and to determine the coordinates value of the peak in such a function.

For instance, referring to FIG. 6(c), the maximum detection voltage $V_{x3}$ and detection voltages $V_{x2}$ and $V_{x4}$ on both sides of the maximum detection voltage can be approximated by a quadratic function. In such a case, the coordinate values xp of the position of the input pen 60 can be determined as follows. The coordinates values of the centers of the respective loop coils 11-1 to 11-48 are expressed by x1 to x48 and the pitch of the array of the loop coils is expressed by $\Delta x$. The following formulae are derived from the relationships between the detection voltages and the coordinate values of the respective loop coils.

$$V_{x2} = A(x2 - xp)^2 + b \quad (3)$$

$$V_{x3} = a(x3 - xp)^2 + b \quad (4)$$

$$V_{x4} = a(x4 - xp)^2 + b \quad (5)$$

where, a and b represent, respectively constants which meet the condition of $a < 0$.

It will also be understood that the following relationships exist.

$$x3 - x2 = \Delta x \quad (6)$$

$$x4 - x2 = 2\Delta x \quad (7)$$

The formulae (4) and (5) therefore can be reformed as follows on condition of the relationships shown by the formulae (6) and (7).

$$xp = x2 + \Delta x/2\{(3V_{x2} - 4V_{x3} + V_{x4})/(V_{x2} - 2V_{x3} + V_{x4})\} \quad (8)$$

It will be understood that the coordinate value xp of the input pen 60 can be determined by extracting, from the group of the detection voltages $Vxl_{x1}$ to $V_{x48}$, the maximum value of the detection voltage as determined through the level check and the voltage values obtained immediately before and immediately after the maximum value of the detection voltage, and conducting a computation in accordance with the formulae (8) by using these three voltage values corresponding to the voltages $V_{x2}$, $V_{x3}$ and $V_{x4}$ in formula (8) and the coordinate of the loop coil which has been checked immediately before the check of the loop coil which exhibits the maximum detection voltage, i.e., the coordinate value x2 in the formula (8).

The number of the loop coils employed in the described embodiment, as well as the manner in which the loop coils are arranged, are illustrative and are not intended for restricting the scope of the invention.

Figure 9:
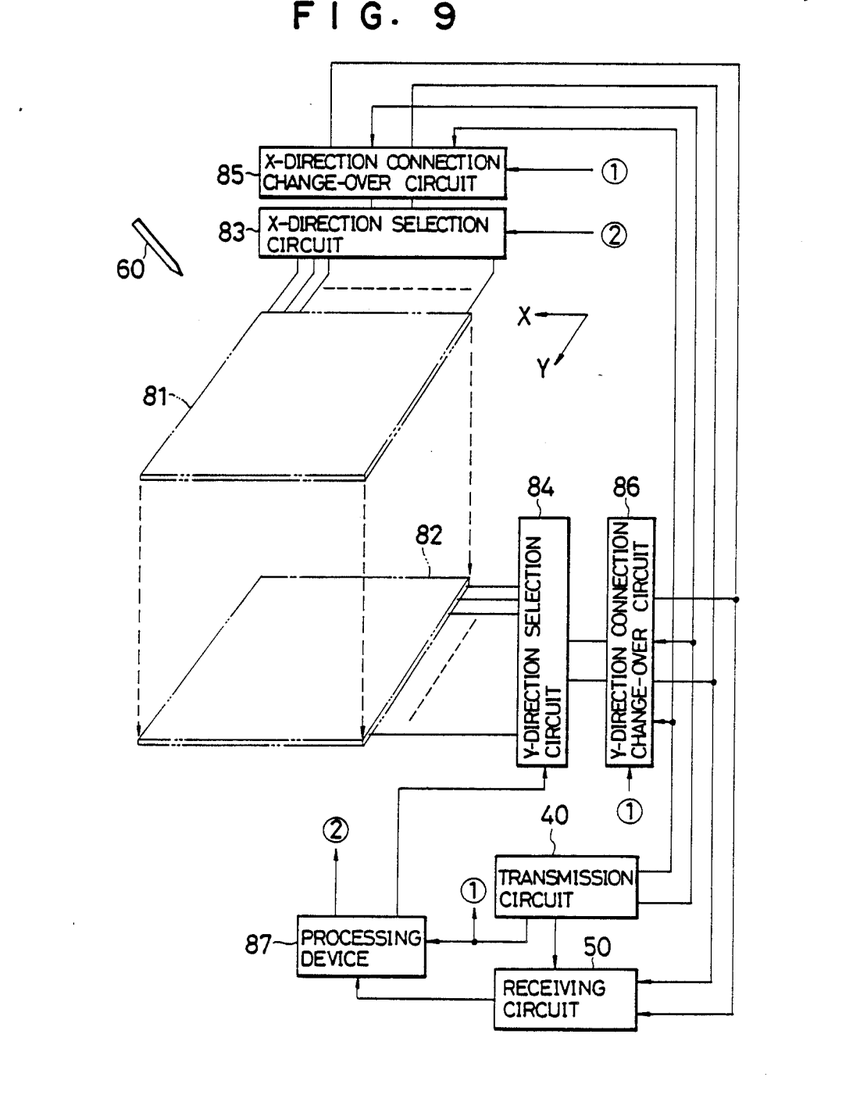
FIG. 9 is an illustration of the construction of a second embodiment of the position detecting apparatus in accordance with the present invention.
Figure 10:
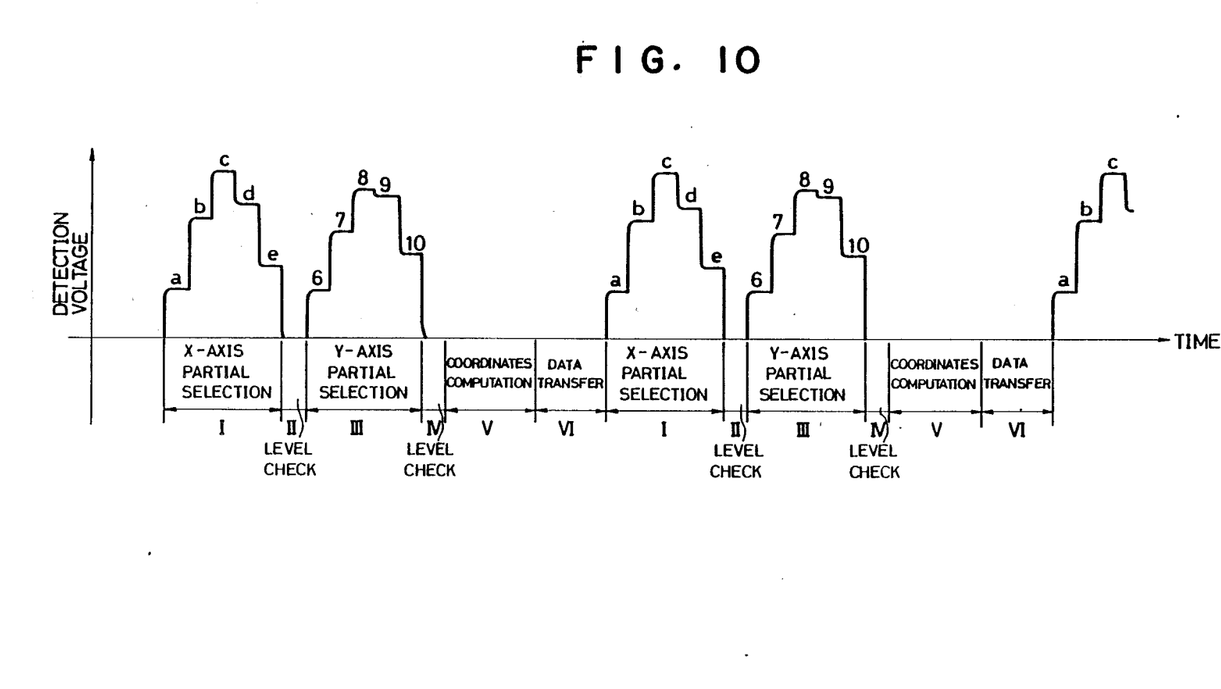
FIG. 10 is a timing chart similar to that shown in FIG. 8 but showing the timings used in the second embodiment.

FIG. 9 shows a second embodiment of the present invention designed for two-dimensional position detection. This embodiment has, therefore, X- and Y-direction position detecting sections 81 and 82, X- and Y-direction selection circuits 83 and 84, and X- and Y-direction connection switching circuits 85 and 86, which have constructions basically the same as the position detection section 10, selection circuit 20 and the connection switching circuit 30 used in the first embodiment designed for one-dimensional position detection. The constructions of these portions, therefore, are not shown in detail in FIG. 9. It is to be understood, however, that the loop coils constituting the X-direction position detecting section are arrayed in the X-direction while the loop coils constituting the Y-direction position detecting section are arrayed in Y-direction, and these groups of loop coils are superposed so as to orthogonally cross each other. This second embodiment also incorporates a processing device 87 which is materially the same as the processing device 70 used in the first embodiment, except that it controls the position detecting operation such that the position detecting in the X-direction and the position detection in the Y-direction are conducted alternately. The timings in the second and subsequent cycles of position detecting operation performed by the processing device 87 are shown in FIG. 10.

Thus, the second embodiment of the present invention enables the position pointed by the position pointer to be detected two-dimensionally, i.e., both in X- and Y-directions, in terms of the X- and Y-coordinates values. The second embodiment further has a transmission circuit 40, receiving circuit 50 and an input pen 60 which may be the same as those used in the first embodiment.

What is claimed is:

1. A position detecting apparatus comprising:
   a tablet;
   a position pointer, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinates values corresponding to said position designated with said pointer on said tablet are detected via said electric wave detecting means.

2. A position detecting apparatus according to claim 1, wherein said electric wave generating means and said electric wave detecting means are alternately operated.

3. A position detecting apparatus according to claim 2, wherein said electric wave generating means and said electric wave detecting means respectively comprises loop coils, said loop coils being used both as said electric wave generating means and said electric wave detecting means.

4. A position detecting means according to claim 3, further comprising:

a position detection section having a plurality of said loop coils arrayed in a side-by-side fashion;

selection circuit for successively selecting said loop coils one by one;

a transmission circuit for generating an AC signal of a predetermined frequency to be delivered to said selected loop coil;

a receiving circuit for detecting an induced voltage of a frequency substantially the same as that of said AC signal from among various voltages induced in said selected loop coils;

a connection switching circuit for connecting said selected loop coils alternately to said transmission circuit and said receiving circuit; and a processing device;

wherein said tuning circuit includes a coil and a capacitor, said tuning circuit resonating with said electric wave produced by said loop coil which is supplied with said AC signal; and wherein said processing device determines the position designated with said position pointer by processing said signals representing the levels of voltages induced in said loop coil.

5. A position detecting apparatus according to claim 3, further comprising:

a position detecting section having divided said loop coils into a plurality of X-loop coils arrayed in a side-by-side fashion in X-direction and a plurality of Y-loop coils arrayed in a side-by-side fashion in Y-direction;

a selection circuit for successively selecting said X- and Y-loop coils one by one;

a transmission circuit for generating an AC signal of a predetermined frequency to be delivered to said X- and Y-loop coils;

a receiving circuit for detecting an induced voltage of a frequency substantially the same as that of said AC signal from among various voltages induced in said selected X- and Y-loop coils;

a connection switching circuit for connecting said selected X- and Y-loop coils alternately to said transmission circuit and said receiving circuit; and a processing device;

wherein said tuning circuit includes a coil and a capacitor, said tuning circuit resonating with the electric wave produced by said X- and Y-loop coils which are supplied with said AC signals; and wherein said processing device determines the position designated with said position pointer by processing the signals representing the levels of voltages induced in each of said X- and Y-loop coils.

6. A position detection apparatus according to claim 4, wherein said tuning circuit of said position pointer is designed to vary a phase relation between the voltage applied to said tuning circuit and the current flowing in said tuning circuit in response to the state of a switch so that the state of said switch can be detected by examining the phase relation between said voltage and said current.

7. A position detection apparatus according to claim 5, wherein said tuning circuit of said position pointer is designed to vary a phase relation between the voltage applied to said tuning circuit and the current flowing in said tuning circuit in response to the state of a switch so that the state of said switch can be detected by examining the phase relation between said voltage and said current.

* * * * *

REEXAMINATION CERTIFICATE (3325th)
United States Patent [19]
Yamanami et al.

[11] B1 4,878,553
[45] Certificate Issued Sep. 16, 1997

[54] POSITION DETECTING APPARATUS

[75] Inventors: Tsuguya Yamanami; Takahiko Funahashi; Toshiaki Senda; Azuma Murakami, all of Saitama-ken, Japan

[73] Assignee: Wacom Co., Ltd., Saitama, Japan

Reexamination Request:
No. 90/004,140, Feb. 16, 1996

Reexamination Certificate for:
Patent No.: 4,878,553
Issued: Nov. 7, 1989
Appl. No.: 95,702
Filed: Sep. 14, 1987

[30] Foreign Application Priority Data

Sep. 12, 1986 [JP] Japan ................. 61-213970

[51] Int. Cl.$^6$ ................................... G08C 21/00
[52] U.S. Cl. ................................... 178/18; 341/15
[58] Field of Search ........................ 178/18, 19, 20, 178/87; 345/156, 173, 144; 364/709.1, 709.11; 341/20, 22, 27, 28, 23, 32; 382/312, 313; 343/870.13

[56] References Cited

U.S. PATENT DOCUMENTS

| | | |
|---|---|---|
| 4,081,603 | 3/1978 | Davis et al. |
| 4,210,775 | 7/1980 | Rodgers et al. |
| 4,423,286 | 12/1983 | Bergeron. |
| 4,482,784 | 11/1984 | Whetstone. |
| 4,532,376 | 7/1985 | Rockwell. |
| 4,734,546 | 3/1988 | Landmeier. |

FOREIGN PATENT DOCUMENTS

| | | |
|---|---|---|
| 52-57727 | 5/1977 | Japan. |
| 59-3537 | 1/1984 | Japan. |

*Primary Examiner*—Curtis Kuntz

[57] ABSTRACT

A position detecting apparatus for detecting a position pointed by a pointer on a system such as a digitizer has the following parts: a position detection section having a plurality of loop coils arrayed in a side-by-side fashion in the direction of position detection; a selection circuit for successively selecting the loop coils one-by-one; a transmission circuit for generating an A.C. signal of a predetermined frequency to be delivered to the selected loop coil; a receiving circuit adapted to detect an induced voltage of a frequency substantially the same as that of the A.C. signal from among various voltages induced in the selected loop coil; a connection switching circuit for connecting the selected loop coil alternately to the transmission circuit and the receiving circuit; a position pointer having a tuning circuit including a coil and a capacitor and adapted to resonate with an electric wave produced by the loop coil which is supplied with the A.C. signal; and a processing device for determining the position pointed by the position pointer by processing signals representing the levels of voltages induced in the loop coils.

B1 4,878,553

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–7, dependent on an amended claim, are determined to be patentable.

New claims 8–38 are added and determined to be patentable.

1. A position detection apparatus comprising:
[a] *an electronic writing* tablet;
a position pointer *for writing via said tablet*, at least one signal being transmitted and received between said position pointer and said *writing* tablet, and a position designated with said position pointer being detected;
a tuning circuit provided in said position pointer;
an electric wave generating means for sending an electric wave to said tuning circuit, said tuning circuit resonating with the electric wave from said electric wave generating means to generate another electric wave to be sent to an electric wave detecting means;
wherein coordinates values corresponding to said position designated with said pointer on said *writing* tablet are detected via said electric wave detecting means.

8. *A position detecting apparatus comprising:*
*a tablet;*
*a position pointer, at least one signal being transmitted and received between said position pointer and said tablet, and a position designated with said position pointer being detected;*
*a tuning circuit provided in said position pointer;*
*an electric wave generating means for sending an electric wave to said tuning circuit, said tuning circuit resonating with the electric wave from said electric wave generating means to generate another electric wave to be sent to an electric wave detecting means;*
*wherein coordinate values corresponding to said position designated with said pointer on said tablet are detected via said electric wave detecting means;*
*said electric wave detecting means that receives said another electric wave including a first number of overlapping loop conductors that are parallel to one another; and*
*a selecting device for selecting only a second number of aid parallel loop conductors less than said first number, proximate a loop conductor which has detected a maximum signal.*

9. *A position detecting apparatus comprising:*
*a tablet;*
*a position pointer, at least one signal being transmitted and received between said position pointer and said tablet, and a position designated with said position pointer being detected;*
*a tuning circuit provided in said position pointer;*
*an electric wave generating means for sending an electric wave to said tuning circuit, said tuning circuit resonating with the electric wave from said electric wave generating means to generate another electric wave to be sent to an electric wave detecting means;*
*wherein coordinate values corresponding to said position designated with said pointer on said tablet are detected via said electric wave detecting means;*
*said electric wave detecting means including a plurality of parallel overlapping loop conductors, each of said loop conductors including a plurality of parallel conductors; and*
*a switching device for selecting a number of said overlapping loop conductors during coordinate detection.*

10. *A position detecting apparatus comprising:*
*a tablet;*
*a position pointer, at least one signal being transmitted and received between said position pointer and said tablet, and a position designated with said position pointer being detected;*
*a tuning circuit provided in said position pointer;*
*an electric wave generating means for sending an electric wave to said tuning circuit, said tuning circuit resonating with the electric wave from said electric wave generating means to generate another electric wave to be sent to an electric wave detecting means;*
*wherein coordinate values corresponding to said position designated with said pointer on said tablet are detected via said electric wave detecting means; and*
*a plurality of parallel detecting loop coils arranged in an overlapping manner so that first and second ones of said loop coils receive or detect said another electric wave from said tuning circuit, the strength of said another electric wave received by the first loop coil being detected as different than that received by the second loop coil, so that the position of said pointer in a direction transverse to conductors of said loop coils can be detected at a resolution greater than lateral spacing of adjacent conductors of said loop coils.*

11. *A position detecting digitizer apparatus comprising:*
*a digitizer tablet;*
*a position pointer, at least one signal being transmitted and received between said position pointer and said tablet, and a position designated with said position pointer being detected;*
*a tuning circuit provided in said position pointer;*
*an electric wave generating means for sending an electric wave to said tuning circuit, said tuning circuit resonating with the electric wave from said electric wave generating means to generate another electric wave to be sent to an electric wave detecting means;*
*wherein coordinates values corresponding to said position designated with said pointer on said tablet are detected via said electric wave detecting means; and*
*said wave detecting means including a number of substantially parallel detecting conductors, at least three of said substantially parallel detecting conductors for detecting said another electric wave sent by said pointer, and wherein a particular coordinate value is determined using said at least three substantially parallel detecting conductors based upon the strength of* said another electric wave sent by said pointer and detected by said at least three substantially parallel detecting conductors.

12. A position detecting digitizer apparatus comprising:

a digitizer tablet;

a position pointer, at least one signal being transmitted and received between said position pointer and said digitizer tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said tablet are detected via said electric wave detecting means;

a number of parallel detecting conductors for detecting said another electric wave sent from said tuning circuit; and means for detecting pointer coordinate values across said tablet in a direction transverse to said parallel detecting conductors, the number of detectable coordinate values in said transverse direction being greater than the number of parallel detecting conductors.

13. A position detecting digitizer apparatus comprising:

a digitizer tablet;

a position pointer, at least one signal being transmitted and received between said position pointer and said digitizer tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means in said digitizer tablet;

wherein coordinate values corresponding to said position designated with said pointer on said digitizer tablet are detected via said electric wave detecting means; and a processing device for determining coordinate values of said pointer with detection of the position of said pointer being performed at a resolution greater than a detecting conductor pitch.

14. A position detecting digitizer apparatus comprising:

a digitizer tablet;

a position pointer, at least one signal being transmitted and received between said position pointer and said digitizer tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said digitizer tablet are detected via said electric wave detecting means; and a processing device for determining coordinate values of said pointer by approximating a waveform of a curve representing signals detected by a plurality of detecting conductors of said electric wave detecting means so that coordinate values of said pointer are detectable at a resolution greater than a detecting conductor pitch.

15. A position detecting apparatus comprising:

an electronic writing digitizer tablet;

a position pointer for writing via said digitizer tablet, at least one signal being transmitted and received between said position pointer and said digitizer tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said digitizer tablet are detected via said electric wave detecting means;

a level check system for determining whether a maximum value detected by said wave detecting means reaches a predetermined level, and for stopping computation of coordinate values when said level check system determines that the predetermined level is not reached; and a processing device including means for initiating computation of coordinate values representing writing by said pointer when signal levels received from said tuning circuit by said electric wave detecting means exceed a predetermined level.

16. The apparatus of claim 15, further including a plurality of overlapping loop coils for receiving electric waves from said tuning circuit.

17. A position detecting apparatus comprising:

a tablet;

a position pointer stylus, at least one signal being transmitted and received between said position pointer stylus and said tablet, and a position designated with said position pointer stylus being detected;

a tuning circuit provided in said position pointer stylus;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer stylus on said tablet are detected via said electric wave detecting means;

said tuning circuit including a non-variable coil with a given inductance; and a pressure sensitive switch connected to said pointer stylus and actuatable by a user, said switch for altering the output of said tuning circuit, without affecting said coil, so as to enable the user to send switch state information to said tablet so that the state of said switch is distinguishable by comparing a received signal with a predetermined signal.

18. The apparatus of claim 17, wherein said pressure sensitive switch is actutable when the user presses said pointer stylus down on said tablet, and wherein said switch alters an impedance of said tuning circuit.

19. A position detecting digitizer apparatus comprising:

an electronic writing tablet;

a position pointer for writing via said tablet, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinates values corresponding to said position designated with said pointer on said tablet are detected via said electric wave detecting means thereby permitting writing via said tablet by said position pointer; and means for using, from a group of signals detected by said wave detecting means, a maximum value signal and values proximate said maximum value signal, for determining the coordinate values corresponding to the position designated with said pointer.

20. A position detecting apparatus comprising:

a tablet;

a position pointer, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said tablet are detected via said electric wave detecting means; and a plurality of conductive coils in said tablet, each of said conductive coils both: (i) sending electric waves to said tuning circuit when current from said wave generating means is passing therethrough; and (ii) receiving electric waves from said tuning circuit when said wave generating means is in an off-state, so that said coordinate values are detected.

21. A position detecting apparatus comprising:

a tablet;

a position pointer, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said tablet are detected via said electric wave detecting means;

said electric wave detecting means including a first number of parallel conductors for receiving said another electric wave from said tuning circuit; and a selecting device for selecting only a second number, less than said first number, of said parallel conductors during a stage of receiving said another electric wave from said tuning circuit so as to more efficiently detect the position of said pointer.

22. The apparatus of claim 21, wherein said parallel conductors include forty-eight (48) different overlapping loop coils.

23. The apparatus of claim 21, wherein, during detecting operations, said parallel conductors are scanned in a predetermined order and said second number is predetermined.

24. The apparatus of claim 23, wherein said predetermined order is a successive numerical order beginning at one end of said parallel conductors and successively scanning said conductors, in successive numerical order, until reaching the other end.

25. The apparatus of claim 21, wherein said electric wave sent from said wave generating means to said tuning circuit is at a first frequency, and said another electric wave sent from said tuning circuit to said wave detecting means is at a second frequency.

26. The apparatus of claim 25, wherein said first and second frequencies are the same.

27. The apparatus of claim 21, wherein said pointer is a stylus including a pressure sensitive switch.

28. The apparatus of claim 27, wherein said tuning circuit includes a non-variable capacitor and a variable capacitor arranged in parallel to one another.

29. The apparatus of claim 27, wherein actuation of said pressure sensitive switch alters phase of said another electric wave sent from said tuning circuit, and wherein the state of said switch is detected using phase information.

30. The apparatus of claim 27, wherein said tuning circuit includes a variable capacitor operatively associated with said pressure sensitive switch.

31. The apparatus of claim 21, wherein said wave detecting means further includes means for detecting change in phase of said another electric wave sent from said tuning circuit.

32. The apparatus of claim 21, wherein said position pointer is a stylus.

33. The apparatus of claim 21, further including means for detecting change in phase of said another electric wave sent from said tuning circuit.

34. The apparatus of claim 33, including means for detecting the state of a switch based upon said detecting change in phase.

35. The apparatus of claim 1, wherein said position pointer is a stylus.

36. A position detecting apparatus comprising:

a tablet;

a position pointer, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinate values corresponding to said position designated with said pointer on said tablet are detected via said electric wave detecting means;

said position pointer including a switch with different states, said switch being sensitive to pressure caused by a user, for changing the phase of said another electric wave sent from said tuning circuit to said electric wave detecting means so as to add phase information to said another electric wave sent by said tuning circuit; and at least one phase detector for detecting the phase of said another electric wave sent to said electric wave detecting means by said tuning circuit in order to distinguish the different states of said switch.

37. A position detecting apparatus comprising:

a tablet;

a position pointer, at least one signal being transmitted and received between said position pointer and said tablet, and a position designated with said position pointer being detected;

a tuning circuit provided in said position pointer;

an electric wave generating means for sending an electric wave to said tuning circuit, said tuning circuit resonating with the electric wave from said electric wave generating means to generate another electric wave to be sent to an electric wave detecting means;

wherein coordinates values corresponding to said position designated with said pointer on said tablet are detected via said electric wave detecting means; and wherein said electric wave generating means and said electric wave detecting means are alternately operated.

38. A position detecting apparatus according to claim 37, wherein said electric wave generating means and said electric wave detecting means respectively comprises loop coils, said loop coils being used both as said electric wave generating means and said electric wave detecting means.

* * * * *